United States Patent
Lee et al.

(10) Patent No.: US 12,387,740 B2
(45) Date of Patent: Aug. 12, 2025

(54) DEVICE AND METHOD FOR REMOVING WIND NOISE AND ELECTRONIC DEVICE COMPRISING WIND NOISE REMOVING DEVICE

(71) Applicant: SAMSUNG ELECTRONICS CO., LTD., Suwon-si (KR)

(72) Inventors: Keunsang Lee, Suwon-si (KR); Lae Hoon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 263 days.

(21) Appl. No.: 18/204,650

(22) Filed: Jun. 1, 2023

(65) Prior Publication Data

US 2024/0046948 A1 Feb. 8, 2024

(30) Foreign Application Priority Data

Aug. 5, 2022 (KR) .................. 10-2022-0098037

(51) Int. Cl.
| | |
|---|---|
| *G10L 21/0264* | (2013.01) |
| *G06F 3/16* | (2006.01) |
| *G10L 21/0216* | (2013.01) |
| *G10L 21/0308* | (2013.01) |
| *H04R 3/00* | (2006.01) |
| *H04R 5/027* | (2006.01) |
| *H04S 3/00* | (2006.01) |

(52) U.S. Cl.
CPC .......... *G10L 21/0264* (2013.01); *G06F 3/162* (2013.01); *G10L 21/0216* (2013.01); *G10L 21/0308* (2013.01); *H04R 3/005* (2013.01); *H04R 5/027* (2013.01); *H04S 3/008* (2013.01); *H04R 2410/07* (2013.01); *H04S 2400/01* (2013.01)

(58) Field of Classification Search
CPC ............. G10L 21/0264; G10L 21/0216; G10L 21/0308; H04R 3/005; H04R 5/027; H04R 2410/07; H04S 2400/01; H04S 3/008; G06F 3/162
USPC ...................... 381/1, 56, 58, 71.1
See application file for complete search history.

(56) References Cited

U.S. PATENT DOCUMENTS

| | | | |
|---|---|---|---|
| 8,184,816 B2 | 5/2012 | Ramakrishnan et al. | |
| 8,861,745 B2 | 10/2014 | Yen et al. | |
| 9,247,347 B2 | 1/2016 | Kitazawa | |
| 9,357,307 B2 | 5/2016 | Taenzer | |
| 9,646,631 B2 | 5/2017 | Kitazawa | |

(Continued)

*Primary Examiner* — William A Jerez Lora
(74) *Attorney, Agent, or Firm* — Sughrue Mion, PLLC

(57) ABSTRACT

A device for removing wind noise is provided. The device includes: processors configured to execute more instructions to control: a correlation maximizing filter to output a third sound signal to a first channel based on a first sound signal, a second sound signal and a first weight vector, and output a fourth sound signal to a second channel based on the first sound signal, the second sound signal and a second weight vector; a sound source separator to receive the third and fourth sound signals through the first and second channels, and perform a sound source separation to output a fifth and sixth sound signals to the first and second channels; a residual wind noise remover to receive the fifth and sixth sound signals, and perform a residual wind noise removal based on the fifth and sixth sound signals to generate an output signal.

20 Claims, 5 Drawing Sheets

(56) References Cited

U.S. PATENT DOCUMENTS

| | | | |
|---|---|---|---|
| 9,949,025 B2 | 4/2018 | Frazier | |
| 11,114,109 B2 | 9/2021 | Bryan et al. | |
| 12,126,957 B1 * | 10/2024 | Yen | H04R 1/1083 |
| 2008/0219470 A1 | 9/2008 | Kimijima | |
| 2012/0140946 A1 * | 6/2012 | Yen | H04R 3/005 |
| | | | 381/92 |
| 2012/0207325 A1 * | 8/2012 | Taenzer | H04R 5/04 |
| | | | 381/94.1 |
| 2014/0161271 A1 * | 6/2014 | Teranishi | H04R 5/04 |
| | | | 381/71.7 |
| 2022/0284913 A1 * | 9/2022 | Yu | H04R 3/04 |

\* cited by examiner

DEVICE AND METHOD FOR REMOVING WIND NOISE AND ELECTRONIC DEVICE COMPRISING WIND NOISE REMOVING DEVICE

CROSS-REFERENCE TO RELATED APPLICATIONS

This application claims priority from Korean Patent Application No. 10-2022-0098037, filed on Aug. 5, 2022, in the Korean Intellectual Property Office, the disclosure of which is incorporated by reference herein in its entirety.

BACKGROUND

1. Field

The present disclosure relates to a device and method for removing wind noise, and an electronic device including the wind noise removing device.

2. Description of Related Art

Related wind noise suppression devices include a detector that discriminates presence or absence of wind noise using wind noise characteristics for removing the wind noise, and a remover that removes the wind noise.

Because the wind noise occurs instantaneously, the accuracy of the wind noise detector is very important. In particular, when a sound signal and wind noise are generated at the same time, the wind noise may not be not accurately detected or the sound signal may be distorted in the course of the wind noise removal process. These problems may degrade voice call quality and recognition performance, and may also degrade recognition performance of video-recorded sound sources.

Therefore, there is a need for research on techniques that may separate the sound signal and the wind noise through a sound source separation, without a separate wind noise detector.

SUMMARY

Aspects of the present disclosure provide a device and method for removing the wind noise that minimize the distortion of the sound signal and have high wind noise removing performance at the same time.

According to an embodiment, a device for removing wind noise includes: one or more memories storing instructions; and one or more processors configured to execute the instructions to control: a correlation maximizing filter to receive a first sound signal through a first channel, receive a second sound signal through a second channel, output a third sound signal to the first channel based on the first sound signal, the second sound signal and a first weight vector, and output a fourth sound signal to the second channel based on the first sound signal, the second sound signal and a second weight vector; a sound source separator to receive the third sound signal through the first channel, receive the fourth sound signal through the second channel, and perform a sound source separation on the third sound signal and the fourth sound signal to output a fifth sound signal to the first channel and output a sixth sound signal to the second channel; a residual wind noise remover to receive the fifth sound signal through the first channel, receive the sixth sound signal through the second channel, and perform a residual wind noise removal based on any one or any combination of the fifth sound signal and the sixth sound signal to generate an output signal; and a weight vector updater to update the first weight vector to maximize correlation between the output signal and the third sound signal, and update the second weight vector to minimize correlation between the output signal and the fourth sound signal.

According to an embodiment, an electronic device including: a first microphone configured to output a first sound signal to a first channel; a second microphone configured to output a second sound signal to a second channel; one or more memories storing instructions; and one or more processors configured to execute the instructions to control a wind noise removing device to: receive the first sound signal through the first channel, receive the second sound signal through the second channel, output an output signal with wind noise removed based on the first sound signal and the second sound signal, generate a third sound signal having a maximum correlation with the output signal, and a fourth sound signal having a minimum correlation with the output signal, based on the first sound signal and the second sound signal, perform a sound source separation on the third sound signal and the fourth sound signal to generate a fifth sound signal and a sixth sound signal, the sixth sound signal including more wind noise components than the fifth sound signal, and perform residual wind noise removal based on any one or any combination of the fifth sound signal and the sixth sound signal to generate the output signal.

According to an embodiment, a method for removing wind noise includes: outputting a first sound signal to a first channel by a first microphone; outputting a second sound signal to a second channel by a second microphone; generating a third sound signal based on the first sound signal and the second sound signal using a first weight vector; generating a fourth sound signal based on the first sound signal and the second sound signal using a second weight vector; performing a sound source separation on the third sound signal and the fourth sound signal to generate a fifth sound signal and a sixth sound signal; performing residual wind noise removal based on any one or any combination of the fifth sound signal and the sixth sound signal to generate an output signal with wind noise removed; updating the first weight vector to maximize correlation of the output signal and the third sound signal; and updating the second weight vector to minimize correlation of the output signal and the fourth sound signal.

Aspects of the present disclosure are not restricted to those set forth herein.

BRIEF DESCRIPTION OF DRAWINGS

The above and other aspects and features will be more apparent from the following description of embodiments, taken in conjunction with the attached drawings, in which.

DETAILED DESCRIPTION

Hereinafter, embodiments will be described with reference to the accompanying drawings. Embodiments described herein are provided as examples, and thus, the present disclosure is not limited thereto, and may be realized in various other forms. Each embodiment provided in the following description is not excluded from being associated with one or more features of another example or another embodiment also provided herein or not provided herein but consistent with the present disclosure. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
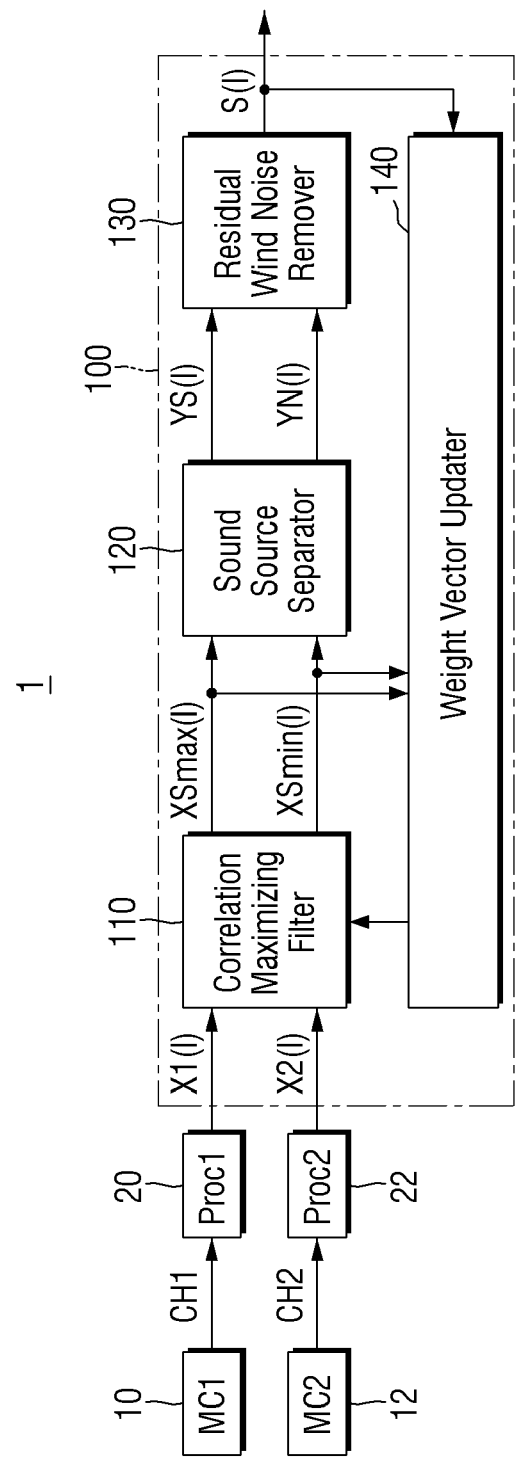
FIG. 1 is a block diagram of an electronic device according to some embodiments.
Figure 2:
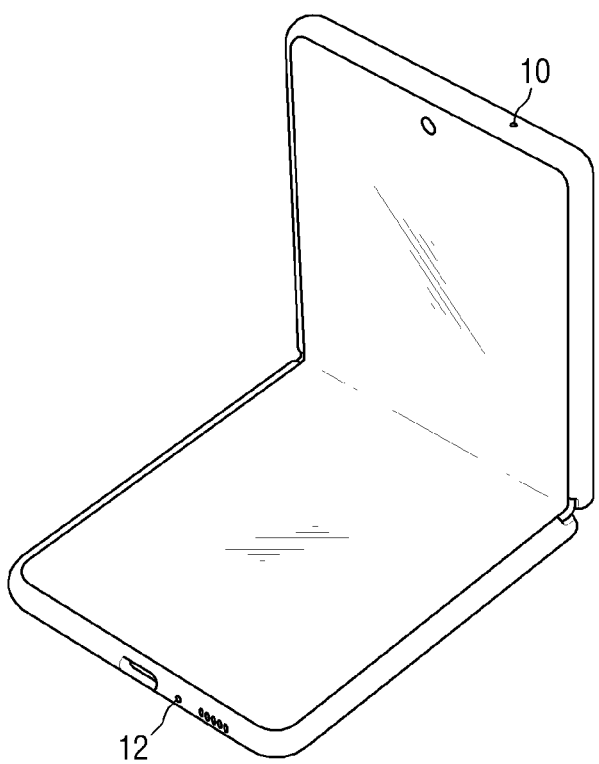
FIG. 2 is a diagram of an electronic device according to some embodiments.
Figure 3:
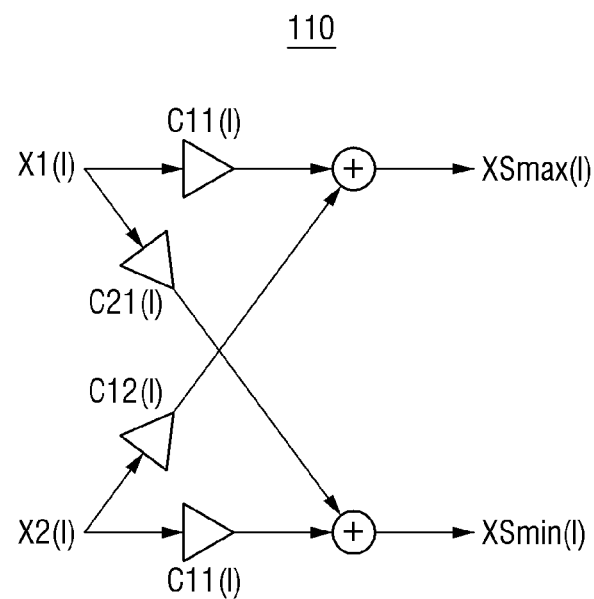
FIG. 3 is a diagram of a correlation maximizing filter according to some embodiments.
Figure 4:
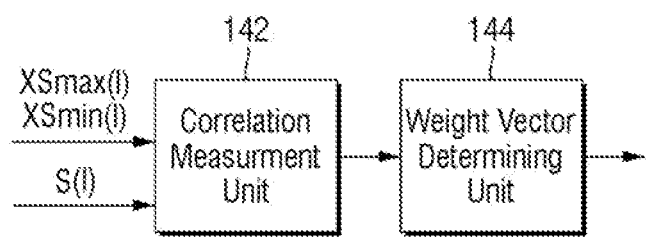
FIG. 4 is a diagram of a weight vector updater according to some embodiments.

FIG. 1 is a block diagram of an electronic device according to some embodiments. FIG. 2 is a diagram of the electronic device according to some embodiments. FIG. 3 is a diagram of a correlation maximizing filter according to some embodiments. FIG. 4 is a diagram of a weight vector updater according to some embodiments.

Referring to FIG. 1, the electronic device 1 may include a plurality of microphones 10 and 12, a plurality of processors 20 and 22, and a wind noise removing device 100.

The plurality of microphones 10 and 12 may be placed at different positions of the electronic device 1 to be spaced apart from each other.

For example, when the electronic device 1 is a smart phone, as shown in FIG. 2, the microphone 10 may be placed at the top of a smart phone, and the microphone 12 may be placed at the bottom of the smart phone at a position spaced apart from the microphone 10.

Although FIGS. 1 and 2 show an embodiment in which the electronic device 1 includes two microphones, embodiments are not limited thereto. For example, the electronic device 1 may include three or more microphones.

The plurality of microphones 10 and 12 may receive sound signals at different positions of the electronic device 1. The sound signals received at the plurality of microphones 10 and 12 may include sound signal components to be processed and noise components to be removed.

The microphone 10 may convert the received sound signal into an electrical signal and output it to a first channel CH1, and the microphone 12 may convert the received sound signal into an electrical signal and output it to a second channel CH2.

A plurality of processors 20 and 22 may perform the necessary processing on the sound signals that are output from the plurality of microphones 10 and 12.

For example, the processor 20 receives the sound signal that is output from the microphone 10 through the first channel CH1, and may perform processing such as analog-to-digital conversion, Fourier transform, and sampling. Therefore, a sound signal $X1(l)$ output from the processor 20 may be a l-th frame sound signal that is sampled after the sound signal output from the microphone 10 is subjected to the analog-to-digital conversion and Fourier transform.

The processor 22 receives the sound signal output from the microphone 12 through the second channel CH2, and may perform processing such as analog-to-digital conversion, Fourier transform, and sampling. Therefore, a sound signal $X2(l)$ output from the processor 22 may be a l-th frame sound signal that is sampled after the sound signal output from the microphone 12 is subjected to the analog-to-digital conversion and Fourier transform.

The wind noise removing device 100 may receive the sound signal $X1(l)$ through the first channel CH1 and the sound signal $X2(l)$ through the second channel CH2. Further, the wind noise removing device 100 may output an output signal $S(l)$ obtained by removing the wind noise components from the sound signals that are input through the plurality of microphones 10 and 12 on the basis of the sound signal $X1(l)$ and the sound signal $X2(l)$. Here, the sound signal $X1(l)$ and the sound signal $X2(l)$ are signals including a target sound source (e.g., the output signal $S(l)$) to be finally extracted and noise together, and may be expressed as a microphone input signal or a noisy signal.

The wind noise removing device 100 may include a correlation maximizing filter 110, a sound source separator 120, a residual wind noise remover 130, and a weight vector updater 140.

The correlation maximizing filter 110 may receive the sound signal $X1(l)$ through the first channel CH1, receive the sound signal $X1(l)$ through the second channel CH2, output a sound signal $XSmax(l)$ to the first channel CH1 using the first channel weight vector, and output a sound signal $XSmin(l)$ to the second channel CH2 using a second weight vector.

Here, the sound signal provided to the correlation maximizing filter 110 may be expressed as Formula 1 below.

$$X_i(l)=H_i S(l)+N_i(l)+V_i(l), i=1,2 \quad \text{[Formula 1]}$$

$Xi(l)$ is a sound signal received through an i-th microphone, $S(l)$ is a sound signal component, and $Hi$ is a transfer function between the sound signal that to be processed and the i-th microphone. $Ni(l)$ is a wind noise input to the i-th microphone, and $Vi(l)$ is a background noise input to the i-th microphone.

Referring to FIG. 3, the correlation maximizing filter 110 may include first weight vectors $C11(l)$ and $C12(l)$ for generating the sound signal $XSmax(l)$ based on the sound signal $X1(l)$ and the sound signal $X2(l)$, and second weight vectors $C21(l)$ and $C22(l)$ for generating the sound signal $XSmin(l)$ based on the sound signal $X1(l)$ and the sound signal $X2(l)$.

When the configuration shown in FIG. 3 is expressed in matrix form, it may be expressed as Formula 2 below.

$$\begin{bmatrix} X_{S_{max}}(l) \\ X_{S_{min}}(l) \end{bmatrix} = \begin{bmatrix} C_{11}(l) & C_{12}(l) \\ C_{21}(l) & C_{22}(l) \end{bmatrix} \begin{bmatrix} X_1(l) \\ X_2(l) \end{bmatrix} \quad \text{[Formula 2]}$$

Here, $C11(l)$ and $C12(l)$ are weight vectors that maximize the correlation between the output signal $S(l)$ and the sound signal $XSmax(l)$, and $C21(l)$ and $C22(l)$ are weight vectors that minimize the correlation between the output signal $S(l)$ and the sound signal $XSmin(l)$. Weight matrix, $C(l)$, which maximizes and minimizes the correlation of target sound sources included in $X1(l)$ and $X2(l)$, can be implemented using sound source localization and beamforming. If the direction of the sound source is given in advance, $C(l)$ is able to be implemented by fixed or adaptive beamforming with the sound source direction information. Below, $C(l)$ can be expressed using fixed beamforming with known direction of the sound source of $\theta_1$ and $\theta_2$.

$$C(l) = \frac{1}{2} \begin{bmatrix} e^{j\theta_1} & e^{j\theta_2} \\ e^{-j\theta_1} & e^{-j\theta_2} \end{bmatrix}$$

However, the sound source should be estimated because it moves in real environment. The sound source localization algorithms, such as Generalize Cross Correlation Phase Transform (GCC-PRAT), Steered Response Power Phase Transform (SRP-PRAT), and Multiple Signal Classification, can be used to estimate $\theta_1$ and $\theta_2$. The weight vectors C11($l$), C12($l$), C21($l$), and C22($l$) may be updated by the weight vector updater 140. It is necessary to check whether the weight matrix C effectively performs correlation maximization and minimization of the target sound source from the input signal and determine the necessity of updating the weight matrix C. To do this, XSmax(l) and XSmin(l) measure the output signal S(l) and correlation, respectively, and if the correlation between XSmax(l) and S(l) has a relatively larger value than that of XSmin(l), the weight matrix C update is not performed, or if two similar values are measured.

The weight vector updater 140 receives the sound signal XSmax(l) and the output signal (S(l-1)) generated based on the (l-1)-th frame sound signal, and may update C11($l$-$l$) and C12($l$-$l$) such that the correlation between the sound signal XSmax(l-1) and the output signal S(l-1) is maximized. C11($l$-$l$) and C12($l$-$l$) thus updated may be used as C11($l$) and C12($l$) that process the l-th frame sound signal.

Also, the weight vector updater 140 receives the sound signal XSmin(l-1) and the output signal S(l-1) generated based on the (l-1)-th frame sound signal, and may update C21($l$-$l$) and C22($l$-$l$) such that the correlation between the sound signal XSmin(l-1) and the output signal S(l-1) is minimized. C21($l$-$l$) and C22($l$-$l$) thus updated may be used as C21($l$) and C22($l$) that process the l-th frame sound signal.

The sound signal XSmax(l) that is output to the first channel CH1 by the correlation maximizing filter 110 may be expressed as in Formula 3 below.

$$X_{S_{max}}(l) = \alpha(l)S(l) + N_{S_{max}}(l) \quad \text{[Formula 3]}$$

The sound signal XSmin(l) that is output to the second channel CH2 by the correlation maximizing filter 110 may be expressed as in Formula 4 below.

$$X_{S_{min}}(l) = \beta(l)S(l) + N_{S_{min}}(l) \quad \text{[Formula 4]}$$

Here, $\alpha(l)$ and $\beta(l)$ are constant values between 0 and 1, and $N_{S_{max}}$ and $N_{S_{min}}$ are wind noises generated by the correlation maximization process, respectively.

As the first and second weight vectors C11, C12, C21, and C22 are updated by the weight vector updater 140, $\alpha(l)$ approaches 1 and $\beta(l)$ approaches 0. Therefore, the sound signal XSmax(l) has the maximum correlation with the output signal S(l), and the sound signal XSmin(l) has the minimum correlation with the output signal S(l).

The sound source separator 120 receives the sound signal XSmax(l) through the first channel CH1, receives the sound signal XSmin(l) through the second channel CH2, and may perform the sound source separation on the sound signal XSmax(l) and the sound signal XSmin(l).

Because the sound source separation separates signals having the same probability distribution characteristics, the sound signal components and wind noise with different probability characteristics can be effectively separated when using the sound source separation. Further, a small amount of distortion occurs in the separated signals.

The sound source separator 120 may separate the sound signal component and the wind noise component included in the sound signal XSmax(l) and the sound signal XSmin(l) obtained by maximizing the correlation into respective channels.

In some embodiments, although the sound source separator 120 may perform the sound source separation on the sound signal XSmax(l) and the sound signal XSmin(l), using an Independent Vector Analysis (IVA), embodiments are not limited thereto.

Because the sound signal XSmax(l) output from the correlation maximizing filter 110 includes more S(l), that is the sound signal components, than the sound signal XSmin (l), when the sound source separation is performed, the sound signal component S(l) included in the sound signal XSmin(l) may be separated to the first channel CH1 side, and the wind noise component included in the sound signal XSmax(l) may be separated to the second channel CH2 side.

Formula 5 below expresses the input and output signals of the IVA in the matrix form.

$$\begin{bmatrix} Y^S(l) \\ Y^N(l) \end{bmatrix} = \begin{bmatrix} W_{11}(l) & W_{12}(l) \\ W_{21}(l) & W_{22}(l) \end{bmatrix} \begin{bmatrix} X_{S_{max}}(l) \\ X_{S_{min}}(l) \end{bmatrix} \quad \text{[Formula 5]}$$

Here, $W_{ij}(l)$ is a weight matrix for separating the sound signal component S(l) and the wind noise component N(l) from the sound signal XSmax(l) and the sound signal XSmin(l).

YS(l), which is the output signal of the IVA, may be expressed by the following Formula 6.

$$Y^S(l) \approx S(l) \epsilon(l) N(l) \quad \text{[Formula 6]}$$

Here, $\epsilon(l)$ is a small integer value.

YN(l), which is the output signal of the IVA, may be expressed by the following Formula 7.

$$Y^N(l) \approx N(l) \quad \text{[Formula 7]}$$

The sound source separator 120 may output the sound signal YS(l) thus generated to the first channel CH1, and output the sound signal YN(l) to the second channel CH2. The sound signal YS(l) includes more sound signal components and less wind noise components than the sound signal YN(l).

The residual wind noise remover 130 receives the sound signal YS(l) through the first channel CH1, receives the sound signal YN(l) through the second channel CH2, and may perform a residual wind noise removal on the basis of at least one of the sound signal YS(l) and the sound signal YN(l) to output an output signal S(l) with wind noise removed.

$\epsilon(l)N(l)$ which is the residual wind noise component may still remain in the sound signal YS(l) that is output from the sound source separator 120. Because $\epsilon(l)$ may generally be assumed to have a very small value, the sound signal YS(l) has a very high Signal to Noise Ratio (SNR). Therefore, the residual wind noise may be removed using a single channel-based speech enhancement algorithm, and methods, such as a Spectral Subtraction (SS), a Minimum Mean Square Error Short Time Spectral Amplitude (MMSE-SATA), a Minimum Mean Square Error Log Spectral Amplitude (MMSE-LSA), an Optimally Modified-LSA (OM-LSA), and a Cepstral Smoothing Method, may be used.

In some embodiments, although the residual wind noise remover 130 may remove the residual wind noise using a MMSE-series algorithm, and may use a minimum controlled recursive averaging (MCRA) method for noise estimation, embodiments are not limited thereto.

On the other hand, in an environment in which the wind noise is extreme, even if the sound source is separated, because $\epsilon(l)$ has a large value and the SNR of the sound signal YS(l) decreases, it may be difficult to remove the residual wind noise. In such an environment, the wind noise removal performance can be improved by utilizing the wind noise component information included in the sound signal YN(l), when removing the wind noise.

Therefore, after the residual wind noise remover 130 measures the SNR of the sound signal YS(l), when the SNR of the sound signal YS(l) exceeds a predetermined threshold value, the residual wind noise remover 130 may perform a single channel residual wind noise removal on the basis of the sound signal YS(l) to output the output signal S(l) with wind noise removed.

Further, when the SNR of the sound signal YS(l) is equal to or less than a predetermined threshold value, the residual wind noise remover 130 may perform a dual channel residual wind noise removal on the basis of the sound signal YS(l) and the sound signal YN(l) to output an output signal S(l) with wind noise removed. YS(l) has a voice signal and a residual wind noise, and YN(l) has only a wind noise component due to IVA, and since the wind noise component appears in a similar frequency band of YS(l) and YN(l), there is a dual using a wind noise component included in YN(l) to minimize voice distortion of YS(l) and remove wind noise.

The weight vector updater 140 receives the output signal S(l) and the sound signal XSmax(l), and may update the first weight vectors ($C11(l)$ and $C12(l)$ of FIG. 3) such that the correlation between the output signal S(l) and the sound signal XSmax(l) is maximized. The first weight vectors ($C11(l)$ and $C12(l)$) thus updated may be used to process the (l+1)-th frame sound signals (e.g., $X1(l+1)$ and $X2(l+1)$).

Further, the weight vector updater 140 receives the output signal S(l) and the sound signal XSmin(l), and may update the second weight vectors ($C21(l)$, and $C22(l)$ of FIG. 3) such that the correlation between the output signal S(l) and the sound signal XSmin(l) is minimized. The second weight vectors ($C21(l)$ and $C22(l)$) thus updated may be used to process the (l+1)-th frame sound signals (e.g., $X1(l+1)$ and $X2(l+1)$).

Referring to FIG. 4, the weight vector updater 140 may include a correlation measurement unit 142 and a weight vector determining unit 144.

The correlation measurement unit 142 may measure the correlation between the output signal S(l) and the sound signal XSmax(l), and measure the correlation between the output signal S(l) and the sound signal XSmin(l).

A correlation measured for the signal X and the signal Y by the correlation measurement unit 142 may be expressed as in Formula 8 below.

$$\Gamma_{XY} = \frac{|XY^*|^2}{|X|^2|Y|^2} \quad \text{[Formula 8]}$$

The weight vector determining unit 144 may update the first weight vectors ($C11(l)$ and $C12(l)$ of FIG. 3) such that the correlation between the output signal S(l) and the sound signal XSmax(l) may be maximized on the basis of the correlation between the output signal S(l) and the sound signal XSmax(l) measured by the correlation measurement unit 142.

Further, the weight vector determining unit 144 may update the second weight vectors ($C21(l)$ and $C22(l)$ of FIG. 3) such that the correlation between the output signal S(l) and the sound signal XSmin(l) may be maximized on the basis of the output signal S(l) and the sound signal XSmin(l) measured by the correlation measurement unit 142.

The first weight vectors ($C11(l)$ and $C12(l)$) and the second weight vectors ($C21(l)$ and $C22(l)$ of FIG. 3) thus updated may be used for processing the (l+1)-th frame sound signal (e.g., $X1(l)$ and $X2(l)$).

Figure 5:
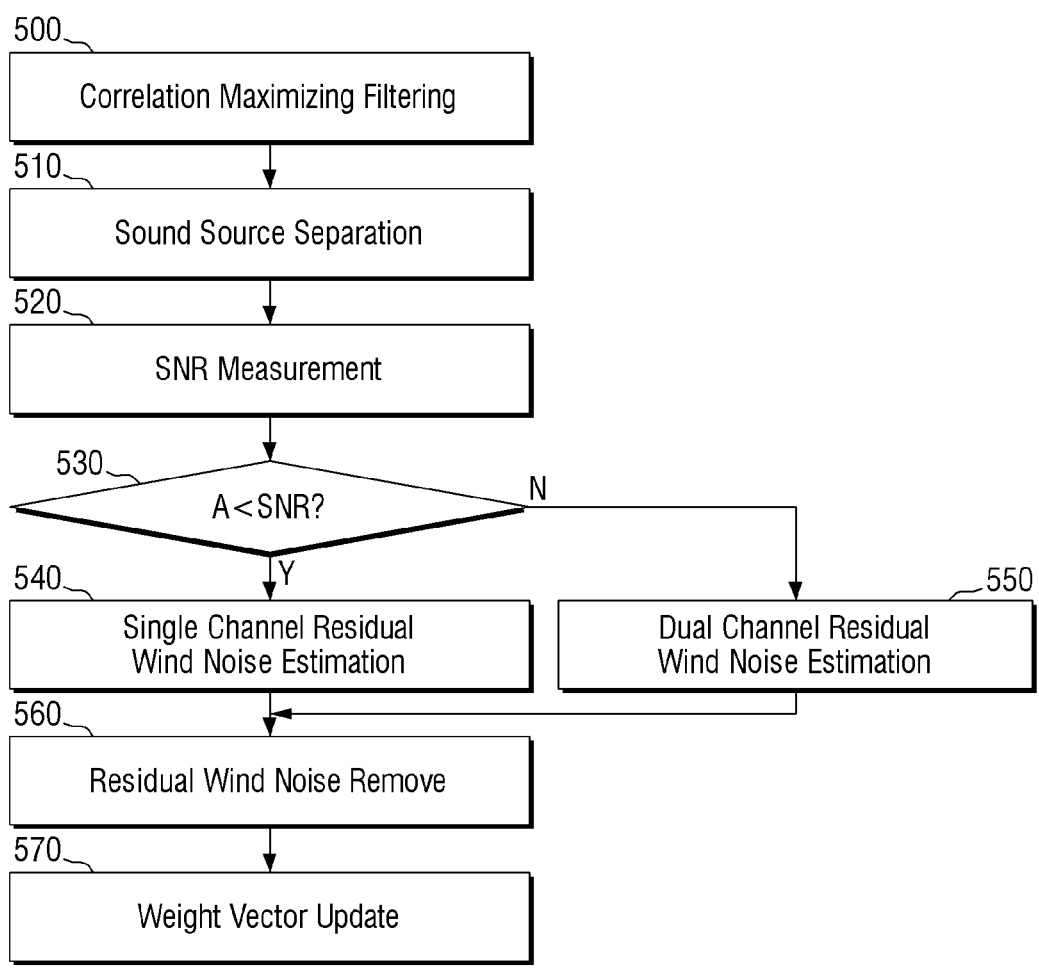
FIG. 5 is a flowchart showing a method for removing the wind noise according to some embodiments.

FIG. 5 is a flowchart showing a method for removing the wind noise according to some embodiments.

Referring to FIG. 5, correlation maximizing filtering is performed (500).

For example, referring to FIG. 1, the correlation maximizing filter 110 may receive the sound signal $X1(l)$ through the first channel CH1, receive the sound signal $X2(l)$ through the second channel CH2, output the sound signal XSmax(l) whose correlation with the output signal S(l) is maximized to the first channel CH1 using the first weight vector, and output the sound signal XSmin(l) whose correlation with the output signal S(l) is minimized to the second channel CH2, using the second weight vector.

Next, a sound source separation is performed (510).

For example, referring to FIG. 1, the sound source separator 120 receives the sound signal XSmax(l) through the first channel CH1, receives the sound signal XSmin(l) through the second channel CH2, and may perform the sound source separation on the sound signal XSmax(l) and the sound signal XSmin(l). In some embodiments, the sound source separator 120 may perform the sound source separation on the sound signal XSmax(l) and the sound signal XSmin(l) using an Independent Vector Analysis (IVA). The sound source separator 120 may output the sound signal YS(l) generated through the sound source separation to the first channel CH1 and output the sound signal YN(l) to the second channel CH2.

Next, an SNR measurement is performed (520).

For example, referring to FIG. 1, the residual wind noise remover 130 receives the sound signal YS(l) through the first channel CH1, receives the sound signal YN(l)) through the second channel CH2, and may measure an SNR of the sound signal YS(l).

If the SNR of the sound signal YS(l) exceeds a predetermined threshold value (530-Y), the residual wind noise remover 130 may perform a single channel residual wind noise estimation on the basis of the sound signal YS(l) (540), and perform a residual wind noise removal to output an output signal S(l) with wind noise removed (560).

If the SNR of the sound signal YS(l) is equal to or less than a predetermined threshold value (530-N), the residual wind noise remover 130 may perform a dual channel residual wind noise estimation on the basis of the sound signal YS(l) and the sound signal YN(l) (550), and perform the residual wind noise removal to output an output signal S(l) with wind noise removed (560).

Next, the weight vector is updated (570).

For example, referring to FIG. 1, the weight vector updater 140 receives the output signal S(l) and the sound signal XSmax(l), and may update the first weight vectors ($C11(l)$ and $C12(l)$ of FIG. 3) such that the correlation between the output signal S(l) and the sound signal XSmax(l) is maximized. The first weight vectors ($C11(l)$ and $C12(l)$) thus updated may be used to process the (l+1)-th frame sound signals (e.g., $X1(l+1)$ and $X2(l+1)$).

Further, the weight vector updater 140 receives the output signal S(l) and the sound signal XSmin(l), and may update the second weight vectors ($C21(l)$ and $C22(l)$ of FIG. 3) such that the correlation between the output signal S(l) and the sound signal XSmin(l) is minimized. The second weight vectors ($C21(l)$ and $C22(l)$) thus updated may be similarly used to process the (l+1)-th frame sound signals (e.g., $X1(l+1)$ and $X2(l+1)$).

In this embodiment, the sound signal component and the wind noise may be separated through the sound source separator, without a separate wind noise detector. This makes it possible to design the wind noise removing device without considering the accuracy of the wind noise detector, and minimize the distortion of the sound signal that may occur in the course of the wind noise removing process.

Figure 6:
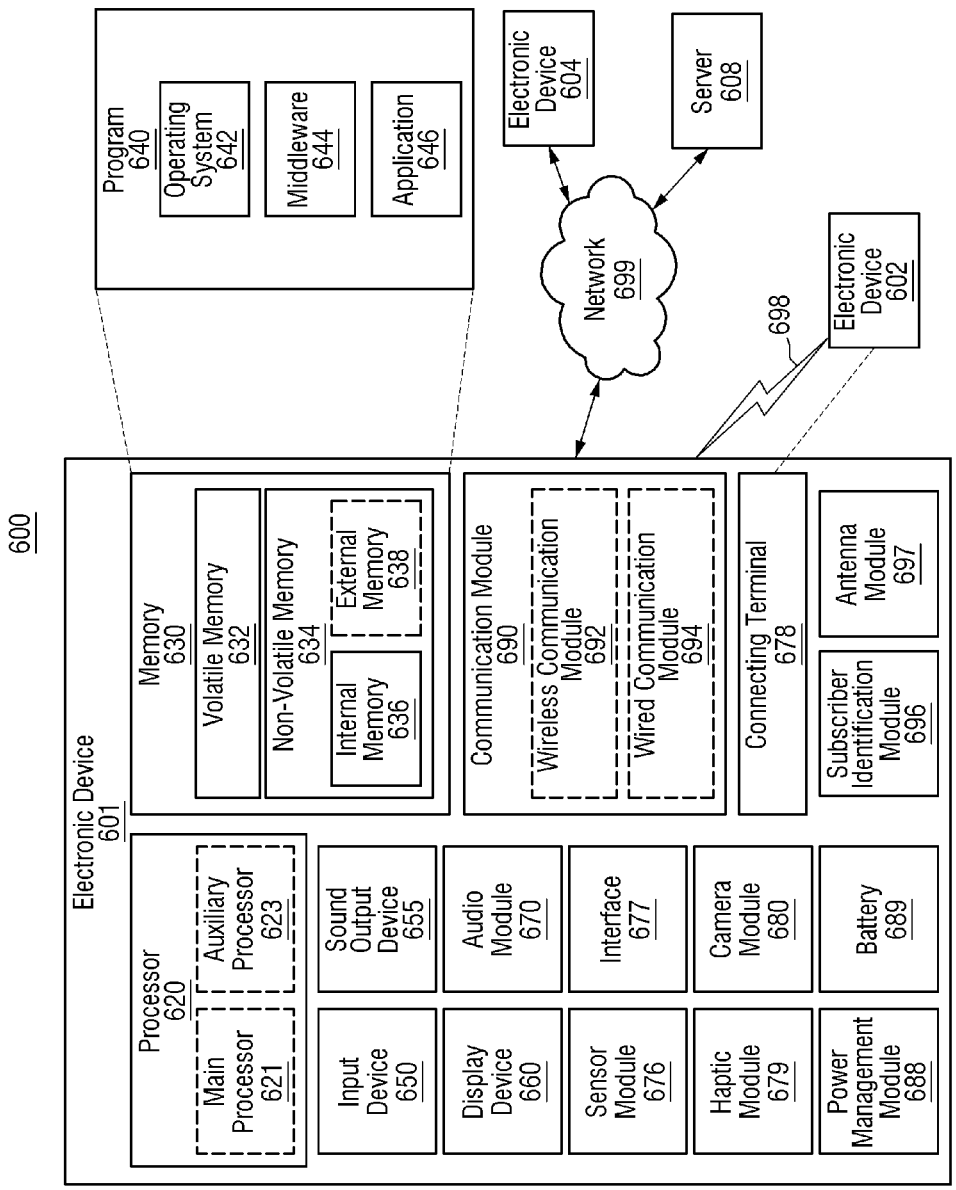
FIG. 6 is a block diagram of an electronic apparatus in a network environment according to some embodiments.

FIG. 6 is a block diagram of an electronic device in a network environment according to some embodiments.

An electronic device 601 in a network environment 600 may communicate with an electronic device 602, for example, through a first network 698 such as a short-range wireless network, or may communicate with an electronic device 604 or a server 608, for example, through a second network 699 such as a long-range wireless network.

The electronic device 601 may communicate with the electronic device 604 through a server 608. The electronic device 601 may include a processor 620, a memory 630, an input device 650, a sound output device 655, an image display device 660, an audio module 670, a sensor module 676, an interface 677, a haptic module 679, a camera module 680, a power management module 688, a battery 689, a communication module 690, a subscriber identification module (SIM) 696, an antenna module 697, and the like.

In some embodiments, at least one of the components, for example, such as the image display device 660 or the camera module 680, may be omitted from the electronic device 601, or one or more other components may be added to the electronic device.

In some embodiments, some of the components may be implemented as a single integrated circuit (IC). For example, the sensor module 676 such as a fingerprint sensor, an iris sensor or an illuminance sensor may be buried in an image display device such as a display.

The processor 620 may execute software (e.g., program 640) for controlling other components of at least one electronic device 601 such as hardware or software component connected to the processor 620, thereby performing various date processing and computations.

As at least a part of data processing or computations, the processor 620 may load command or data received from other components such as the sensor module 676 or the communication module 690 to a volatile memory 632, process the command or data stored in the volatile memory 632, and store the result data in a non-volatile memory 634.

The processor 620 may include, for example, a main processor 621 such as a central processing unit (CPU) or an application processor (AP), and an auxiliary processor 623 that can operate independently of or together with the main processor 621. In some embodiments, when the main processor 621 is an application processor, the aforementioned plurality of processors (20 and 22 of FIG. 1) and the wind noise removing device (100 of FIG. 1) may be included in the main processor 621.

Such an auxiliary processor 623 may include, for example, a graphic processing unit (GPU), an image signal processor (ISP), a sensor hub processor, a communication processor (CP) or the like.

In some embodiments, the auxiliary processor 623 may be configured to consume less power than the main processor 621 or perform specific functions. The auxiliary processor 623 may be implemented separately from or as a part of the main processor 621.

The auxiliary processor 623 may control at least some of the functions or statuses associated with at least one component among the components of the electronic device 601, for example, on behalf of the main processor 621 while the main processor 621 is in an inactive status, or along with the main processor 621 while the main processor 621 is in an active status.

The memory 630 may store various data used by at least one component of the electronic device 601. Various data may include, for example, input data or output data for software and commands associated with this. The memory 630 may include the volatile memory 632 and the non-volatile memory 634.

The program 640 may be stored as software in the memory 630, and may include, for example, an operating system (OS) 642, a middleware 644 or an application 646.

The input device 650 may receive commands or data to be used by other components of the electronic device 601 from the outside of the electronic device 601. The input device 650 may include, for example, a microphone, a mouse or a keyboard, and the input device 650 may include the plurality of microphones (10 and 12 of FIG. 1) as described above.

The sound output device 655 may output a sound signal to the outside of the electronic device 601. The sound output device 655 may include, for example, a speaker. Multimedia data may be output through the speaker.

The image display device 660 may visually provide information to the outside of the electronic device 601. The image display device 660 may include, for example, a display, a hologram device or a projector and a control circuit for controlling the corresponding one among the display, the hologram device or the projector.

In some embodiments, the image display device 660 may include a touch circuit configured to detect a touch, and a sensor circuit, for example, such as a pressure sensor configured to measure strength of force caused by the touch.

The audio module 670 may convert the sound into an electrical signal or vice versa. In some embodiments, the audio module 670 may acquire the sound through the input device 650 or may output the sound through the sound output device 655 or a headphone of the external electronic device 602 that is directly or wirelessly connected to the electronic device. In some embodiments, the plurality of processors (20 and 22 of FIG. 1) and the wind noise removing device (100 of FIG. 1) described above may be included in such an audio module 670.

The sensor module 676 detects an operating status, such as power or temperature, of the electronic device 601 or an external environmental status, such as a user's status, and may generate an electrical signal or data value corresponding to the detected status. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biosensor, a temperature sensor, a humidity sensor or an illuminance sensor.

The interface 677 may support one or more specified protocols that may be used by the electronic device 601 directly or wirelessly to the external electronic device 602. In some embodiments, the interface 677 may include, for example, a high resolution multimedia interface (HDMI), a universal serial bus (USB) interface, a secure digital (SD) card interface or an audio interface.

A connecting terminal 678 may include a connector through which the electronic device 601 may be physically connected to the external electronic device 602. In some embodiments, the connecting terminal 678 may include, for example, an HDMI connector, a USB connector, an SD card connector or an audio connector (e.g., a headphone connector or the like).

The haptic module 679 may convert an electrical signal into a mechanical stimulus, for example, such as vibration or motion that may be perceived by the user through tactile sensation or kinesthetic sensation. In some embodiments, the haptic module 679 may include, for example, a motor, a piezoelectric element or an electrical stimulator.

The camera module 680 may capture still images or moving images. In some embodiments, the camera module 680 may include one or more lenses, an image sensor, an image signal processor, a flash, and the like.

The power management module 688 may manage the power to be supplied to the electronic device 601. The power management module 688 may be implemented, for example, as at least a part of a power management integrated circuit (PMIC).

The battery 689 may supply power to at least one component of the electronic device 601. According to an embodiment, the battery 689 may include, for example, a non-rechargeable primary battery, a rechargeable secondary battery or a fuel cell.

The communication module 690 may support establishment of direct communication channel or wireless communication channel between the electronic device 601 and the external electronic device, for example, such as the electronic device 602, the electronic device 604 or the server 608, and may perform communication through the established communication channel.

The communication module 690 may include one or more communication processors that operate independently of the processor 620 and support direct communication or wireless communication.

In some embodiments, the communication module 690 may include a wireless communication module 692, for example, such as a cellular communication module, a short-range wireless communication module or a global navigation satellite system (GNSS) communication module, or a wired communication module 694, for example, such as a local area network (LAN) communication module or a power line communication module (PLC).

Among these communication modules, the corresponding communication module may communicate with the external electronic device through the first network 698, for example, such as a Bluetooth™, a WiFi (wireless-fidelity) direct or an IrDA (standard of the Infrared Data Association) or the second network 699, for example, such as a cellular communication network, an Internet or a long-range communication network Various types of communication modules may be implemented as a single component or may be implemented as a plurality of components separated from each other. The wireless communication module 692 may verify and authenticate the electronic device 601 inside a communication network such as the first network 698 or the second network 699, for example, using subscriber information such as an International Mobile Subscriber Identifier (IMSI) stored in the subscriber identification module 696.

The antenna module 697 may transmit or receive signals or power to and from the outside of the electronic device 601. In some embodiments, the antenna module 697 may include one or more antennas, and hence, at least one antenna which is suitable for communication scheme used in communication networks such as the first network 698 or the second network 699 may be selected by the communication module 690. The signal or power may be transmitted or received between the communication module and the external electronic device through at least one selected antenna.

At least some of the components may be connected to each other to perform signal communication between them through an inter-peripheral communication scheme, for example, such as a GPIO (general purpose input and output), a SPI (serial peripheral interface) or a MIPI (mobile industry processor interface).

In some embodiments, command or data may be transmitted or received between the electronic device 601 and the external electronic device 606 through the server 608 connected to the second network 699. Each of the electronic devices 602 and 606 may be devices which are the same type as or different type from of the electronic device 601. All or some of the operations to be executed in the electronic device 601 may be executed in one or more external electronic devices 602, 606 or 608. For example, all or some of the operations to be executed in the electronic device 601 may be performed in one or more external electronic devices 602, 606 or 608.

For example, if the electronic device 601 performs the function or service automatically or upon request from a user or other devices, the electronic device 601 that executes that function or service may require one or more external electronic devices to perform at least some of the function or service on behalf of this or additionally. One or more external electronic devices that receive the request may perform at least some of the requested function or service or additional functions or additional services associated with the request, and transfer the results of the execution to the electronic device 601. The electronic device 601 provides the results as at least part of the response to the request, with or without accompanying further processing of the results. For example, cloud computing, distributed computing or client-server computing techniques may be used for this purpose.

The method described above with reference to FIG. 5 may be implemented by software such as program 640 that includes one or more commands stored in a machine-readable storage medium (e.g., the internal memory 636 or the external memory 638).

For example, the processor 620 of the electronic device 601 invokes at least some of one or more commands stored in the storage medium, and may execute the software, with or without usage of one or more other components under the control of the processor 620.

Accordingly, the device (e.g., the electronic device 601) is operable to perform at least one function according to at least one invoked command. One or more commands may include code generated by a compiler or code that may be executed by an interpreter.

The machine-readable storage medium may be provided in the form of non-volatile storage media. Although the term "non-transitory" means that the storage medium is a tangible device and does not include signals, for example, such as electromagnetic wave, this term does not distinguish between a case where data is permanently stored in the storage media and a case where data is temporarily stored in the storage medium.

In some embodiments, each of the components represented by a block, such as those illustrated in FIGS. 1, 4 and 6, may be implemented as various numbers of hardware, software and/or firmware structures that execute respective functions described above, according to embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may include a module, a program, or a part of code, which contains one or more executable instructions for performing specified logic functions, and executed by one or more microprocessors or other control apparatuses. Also, at least one of these components may further include or may be implemented by a processor such as a central processing unit (CPU) that performs the respective functions, a microprocessor, or the like. Functional aspects of example embodiments may be implemented in algorithms that execute on one or more processors. Furthermore, the components, elements, modules or units represented by a block or processing operations may employ any number of related art techniques for electronics configuration, signal processing and/or control, data processing and the like.

While aspects of embodiments have been particularly shown and described, it will be understood that various changes in form and details may be made therein without departing from the spirit and scope of the following claims.

What is claimed is:

1. A device for removing wind noise comprising:
   one or more memories storing instructions; and
   one or more processors configured to execute the instructions to control:
      a correlation maximizing filter to receive a first sound signal through a first channel, receive a second sound signal through a second channel, output a third sound signal to the first channel based on the first sound signal, the second sound signal and a first weight vector, and output a fourth sound signal to the second channel based on the first sound signal, the second sound signal and a second weight vector;
      a sound source separator to receive the third sound signal through the first channel, receive the fourth sound signal through the second channel, and perform a sound source separation on the third sound signal and the fourth sound signal to output a fifth sound signal to the first channel and output a sixth sound signal to the second channel;
      a residual wind noise remover to receive the fifth sound signal through the first channel, receive the sixth sound signal through the second channel, and perform a residual wind noise removal based on any one or any combination of the fifth sound signal and the sixth sound signal to generate an output signal; and
      a weight vector updater to update the first weight vector to maximize correlation between the output signal and the third sound signal, and update the second weight vector to minimize correlation between the output signal and the fourth sound signal.

2. The device for removing wind noise of claim 1, further comprising:
   a first interface configured to receive the first sound signal from a first microphone; and
   a second interface configured to receive the second sound signal from a second microphone different from the first microphone.

3. The device for removing wind noise of claim 1, wherein the first weight vector comprises a third weight vector calculated with the first sound signal, and a fourth weight vector calculated with the second sound signal, and
   wherein the second weight vector comprises a fifth weight vector calculated with the first sound signal, and a sixth weight vector calculated with the second sound signal.

4. The device for removing wind noise of claim 3, wherein the one or more processors are further configured to execute the instructions to control the weight vector updater to update the third weight vector and the fourth weight vector to maximize the correlation between the output signal and the third sound signal, and update the fifth weight vector and the sixth weight vector to minimize the correlation between the output signal and the fourth sound signal.

5. The device for removing wind noise of claim 1, wherein the sixth sound signal comprises more wind noise components than the fifth sound signal.

6. The device for removing wind noise of claim 5, wherein the fifth sound signal comprises more sound signal components than the sixth sound signal.

7. The device for removing wind noise of claim 1, wherein the one or more processors are further configured to execute the instructions to control the residual wind noise remover to identify a signal to noise ratio (SNR) of the fifth sound signal, and determine a method for removing residual wind noise based on the SNR.

8. The device for removing wind noise of claim 7, wherein the one or more processors are further configured to execute the instructions to control the residual wind noise remover to:
   perform the residual wind noise removal based on the fifth sound signal in response to the SNR exceeding a threshold value, and
   perform the residual wind noise removal based on the fifth sound signal and the sixth sound signal in response to the SNR being below the threshold value.

9. The device for removing wind noise of claim 1, wherein the one or more processors are further configured to execute the instructions to control the sound source separator to perform the sound source separation based on the third sound signal and the fourth sound signal using an independent vector analysis (IVA).

10. An electronic device comprising:
    a first microphone configured to output a first sound signal to a first channel;
    a second microphone configured to output a second sound signal to a second channel;
    one or more memories storing instructions; and
    one or more processors configured to execute the instructions to control a wind noise removing device to:
       receive the first sound signal through the first channel, receive the second sound signal through the second channel,
       output an output signal with wind noise removed based on the first sound signal and the second sound signal,
       generate a third sound signal having a maximum correlation with the output signal, and a fourth sound signal having a minimum correlation with the output signal, based on the first sound signal and the second sound signal,
       perform a sound source separation on the third sound signal and the fourth sound signal to generate a fifth sound signal and a sixth sound signal, the sixth sound signal comprising more wind noise components than the fifth sound signal, and
       perform residual wind noise removal based on any one or any combination of the fifth sound signal and the sixth sound signal to generate the output signal.

11. The electronic device of claim 10, wherein the one or more processors are further configured to execute the instructions to control the wind noise removing device to determine a method for removing residual wind noise based on a signal to noise ratio (SNR) of the fifth sound signal.

12. The electronic device of claim 11, wherein the one or more processors are further configured to execute the instructions to control the wind noise removing device to:

perform the residual wind noise removal based on the fifth sound signal in response to the SNR of the fifth sound signal exceeding a threshold value, and perform the residual wind noise removal based on the fifth sound signal and the sixth sound signal in response to the SNR being below the threshold value.

13. The electronic device of claim 10, wherein the first microphone and the second microphone are spaced apart from each other in the electronic device.

14. The electronic device of claim 10, wherein the one or more processors are further configured to execute the instructions to control the wind noise removing device to output the third sound signal to the first channel using a first weight vector, and output the fourth sound signal to the second channel using a second weight vector, wherein the first weight vector is updated to maximize correlation of the output signal and the third sound signal, and wherein the second weight vector is updated to minimize correlation of the output signal and the fourth sound signal.

15. The electronic device of claim 10, wherein the fifth sound signal comprises more sound signal components than the sixth sound signal.

16. A method for removing wind noise, the method comprising:

outputting a first sound signal to a first channel by a first microphone;

outputting a second sound signal to a second channel by a second microphone;

generating a third sound signal based on the first sound signal and the second sound signal using a first weight vector;

generating a fourth sound signal based on the first sound signal and the second sound signal using a second weight vector;

performing a sound source separation on the third sound signal and the fourth sound signal to generate a fifth sound signal and a sixth sound signal;

performing residual wind noise removal based on any one or any combination of the fifth sound signal and the sixth sound signal to generate an output signal with wind noise removed;

updating the first weight vector to maximize correlation of the output signal and the third sound signal; and updating the second weight vector to minimize correlation of the output signal and the fourth sound signal.

17. The method for removing wind noise of claim 16, further comprising performing analog-to-digital converting on the first sound signal and the second sound signal by a processor comprising an analog-to-digital converter.

18. The method for removing wind noise of claim 16, wherein the performing the residual wind noise removal comprises:

identifying a signal to noise ratio (SNR) of the fifth sound signal, and determining whether to perform the residual wind noise removal using a first method or a second method based on the SNR of the fifth sound signal.

19. The method for removing wind noise of claim 18, wherein the determining whether to perform the residual wind noise removal using the first method or the second method based on the SNR of the fifth sound signal comprises:

performing the residual wind noise removal based on the fifth sound signal, in response to the SNR of the fifth sound signal exceeding a threshold value, and performing the residual wind noise removal based on the fifth sound signal and the sixth sound signal, in response to the SNR of the fifth sound signal being below the threshold value.

20. The method for removing wind noise of claim 16, wherein the fifth sound signal comprises more sound signal components than the sixth sound signal, and wherein the sixth sound signal comprises more wind noise components than the fifth sound signal.

* * * * *